United States Patent [19]

Paul

[11] Patent Number: 4,630,911
[45] Date of Patent: Dec. 23, 1986

[54] CAMERA GUN

[76] Inventor: Larry W. Paul, 28950 Bonita Vista Rd., Mountain Center, Calif. 92361

[21] Appl. No.: 653,025

[22] Filed: Sep. 21, 1984

[51] Int. Cl.⁴ .................. G03B 17/00; G03B 29/00; G03B 3/00
[52] U.S. Cl. .................................. 354/82; 354/195.1; 354/293; 352/95
[58] Field of Search .............. 354/76, 81, 82, 195.1, 354/288, 293; 352/95, 243; 42/85, 94; 89/37.04, 40.06

[56] References Cited

U.S. PATENT DOCUMENTS

| | | |
|---|---|---|
| 286,447 | 10/1883 | Kilburn . |
| 624,693 | 5/1899 | Sheffield . |
| 791,800 | 6/1905 | Laur . |
| 1,112,732 | 10/1914 | Uhl .......................................... 42/94 |
| 1,236,947 | 8/1917 | Landis . |
| 1,246,328 | 11/1917 | Rutzen . |
| 2,182,097 | 12/1939 | Schenk . |
| 2,414,083 | 1/1947 | Borden . |
| 2,416,769 | 3/1947 | Palmer . |
| 2,703,691 | 3/1955 | Minnis .............................. 354/293 |
| 2,763,456 | 9/1956 | Breer ..................................... 354/82 |
| 2,806,416 | 9/1957 | Jones ..................................... 354/82 |
| 2,943,547 | 7/1960 | Martin . |
| 3,062,114 | 11/1962 | Palos . |
| 3,327,422 | 6/1967 | Harris ..................................... 42/94 |
| 3,688,665 | 9/1972 | Herden .................................. 352/95 |
| 3,785,261 | 1/1974 | Ganteaume . |
| 3,827,061 | 7/1974 | Kellner . |
| 3,877,048 | 4/1975 | Kellner . |
| 4,202,115 | 5/1980 | Borel . |
| 4,289,393 | 9/1981 | Kawazoe ............................. 354/293 |
| 4,309,095 | 1/1982 | Buckley . |
| 4,415,250 | 11/1983 | Rossmann et al. . |
| 4,437,753 | 3/1984 | Dunn ..................................... 354/82 |
| 4,470,216 | 9/1984 | Harris ..................................... 42/85 |
| 4,530,580 | 7/1985 | Ueda et al. .......................... 354/82 |
| 4,542,966 | 9/1985 | Knaudt ............................... 354/293 |

FOREIGN PATENT DOCUMENTS 201907 4/1968 U.S.S.R. .
682863 8/1979 U.S.S.R. .

OTHER PUBLICATIONS

Novoflex—Super Rapid-Focussing.
Novoflex—The Fastest Focusing 200 mm.

Primary Examiner—A. A. Mathews
Attorney, Agent, or Firm—Finnegan, Henderson, Farabow, Garrett & Dunner

[57] ABSTRACT

A simulated firearm to be used in conjunction with a camera which includes features which are realistic to actual firearms but which can be used instead for purposes of photography. Such features include film storage chambers used in conjunction with a sliding bolt, a sliding focus actuator which is integral with a quarter rib, and a support stand which is stored in the barrel.

46 Claims, 12 Drawing Figures

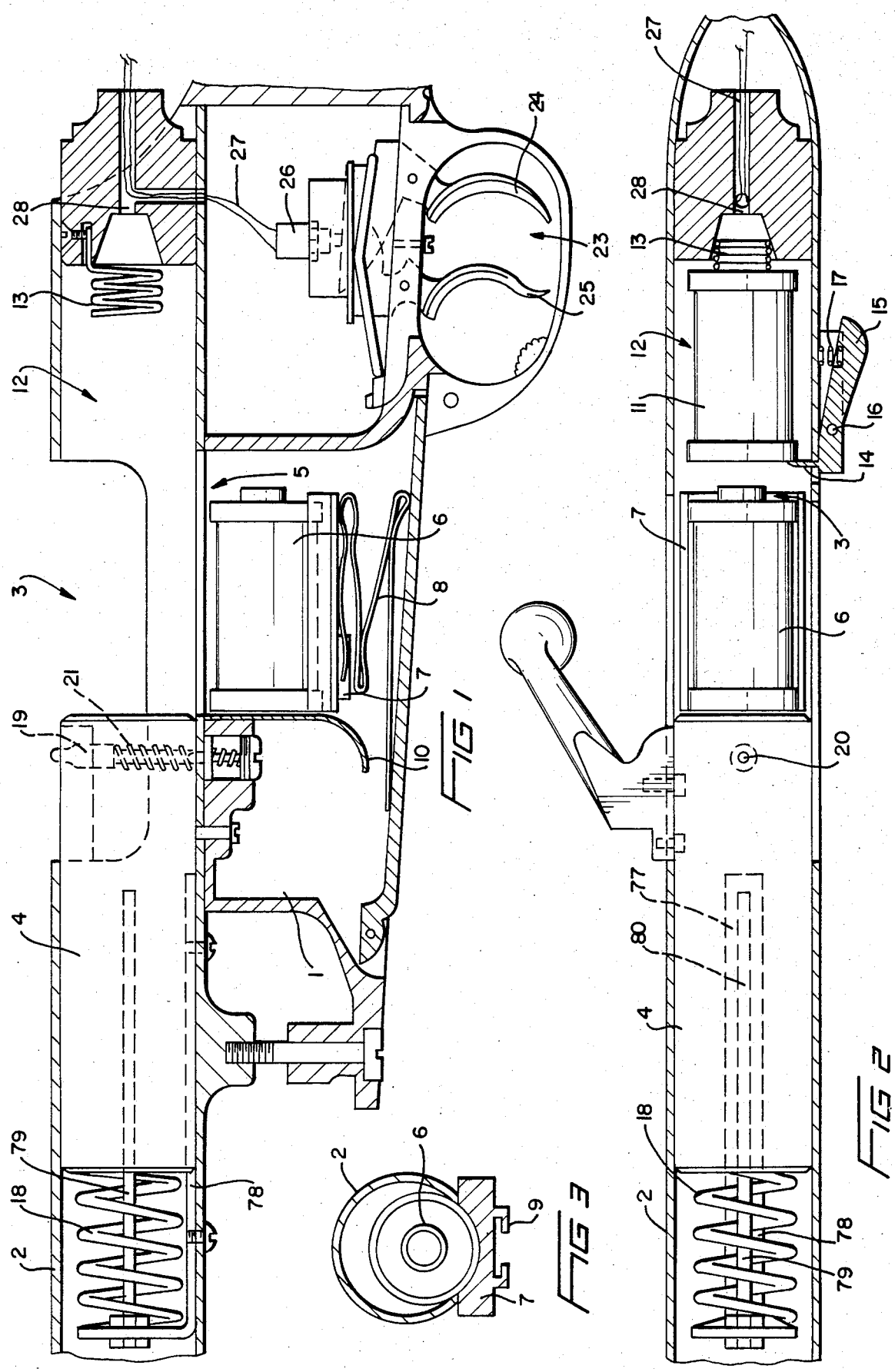

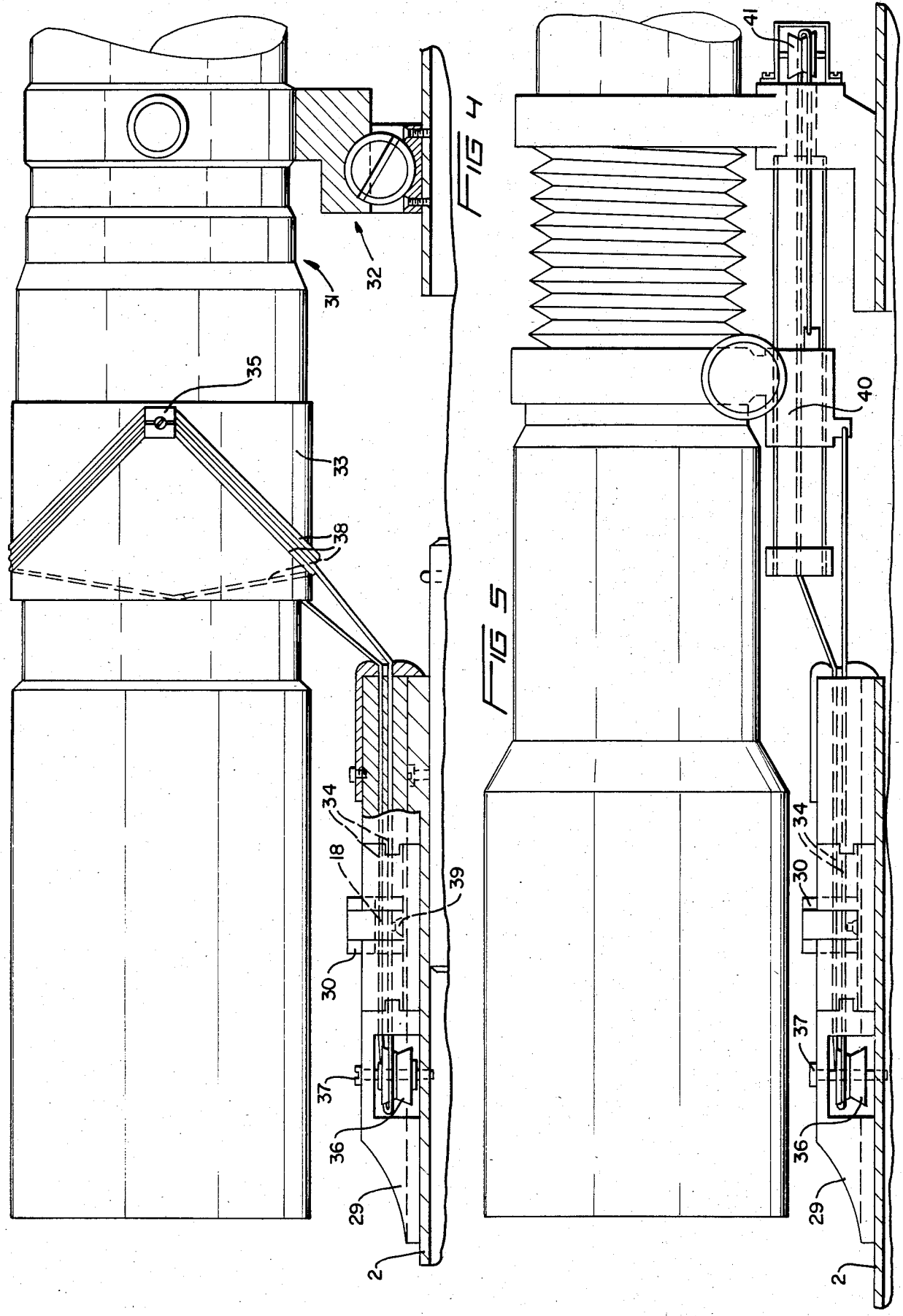

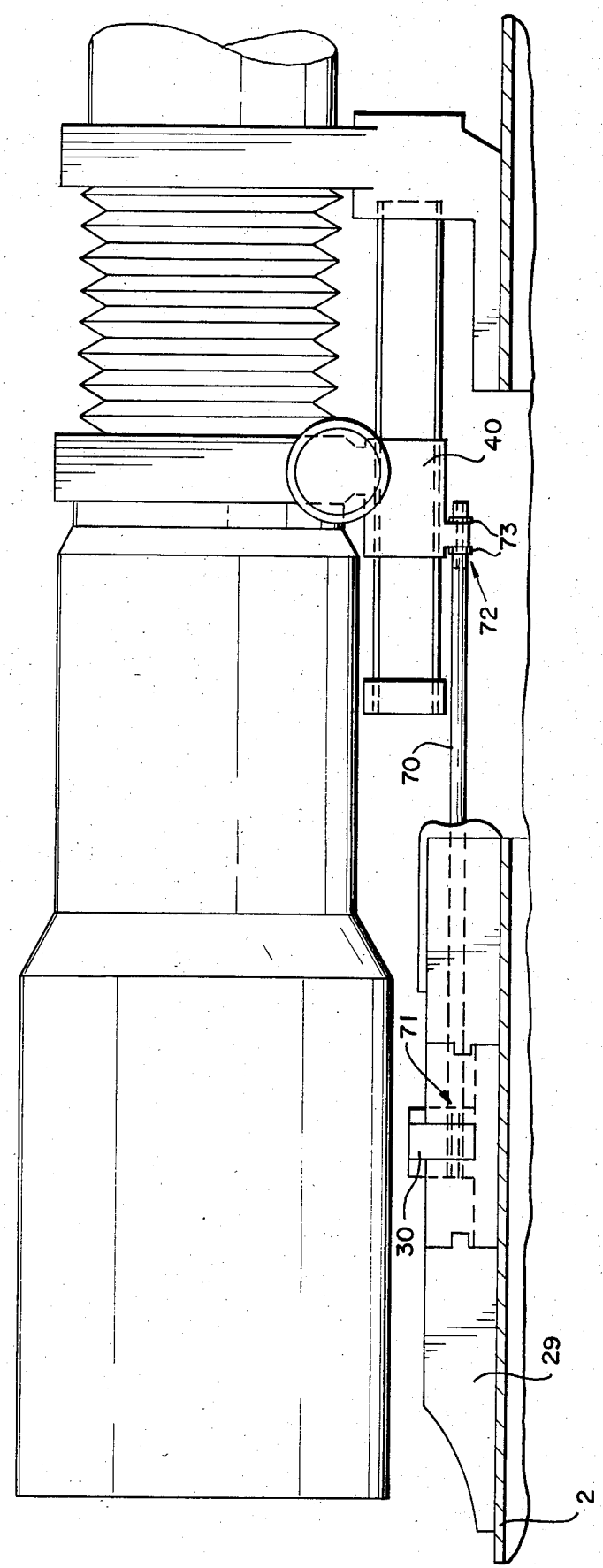

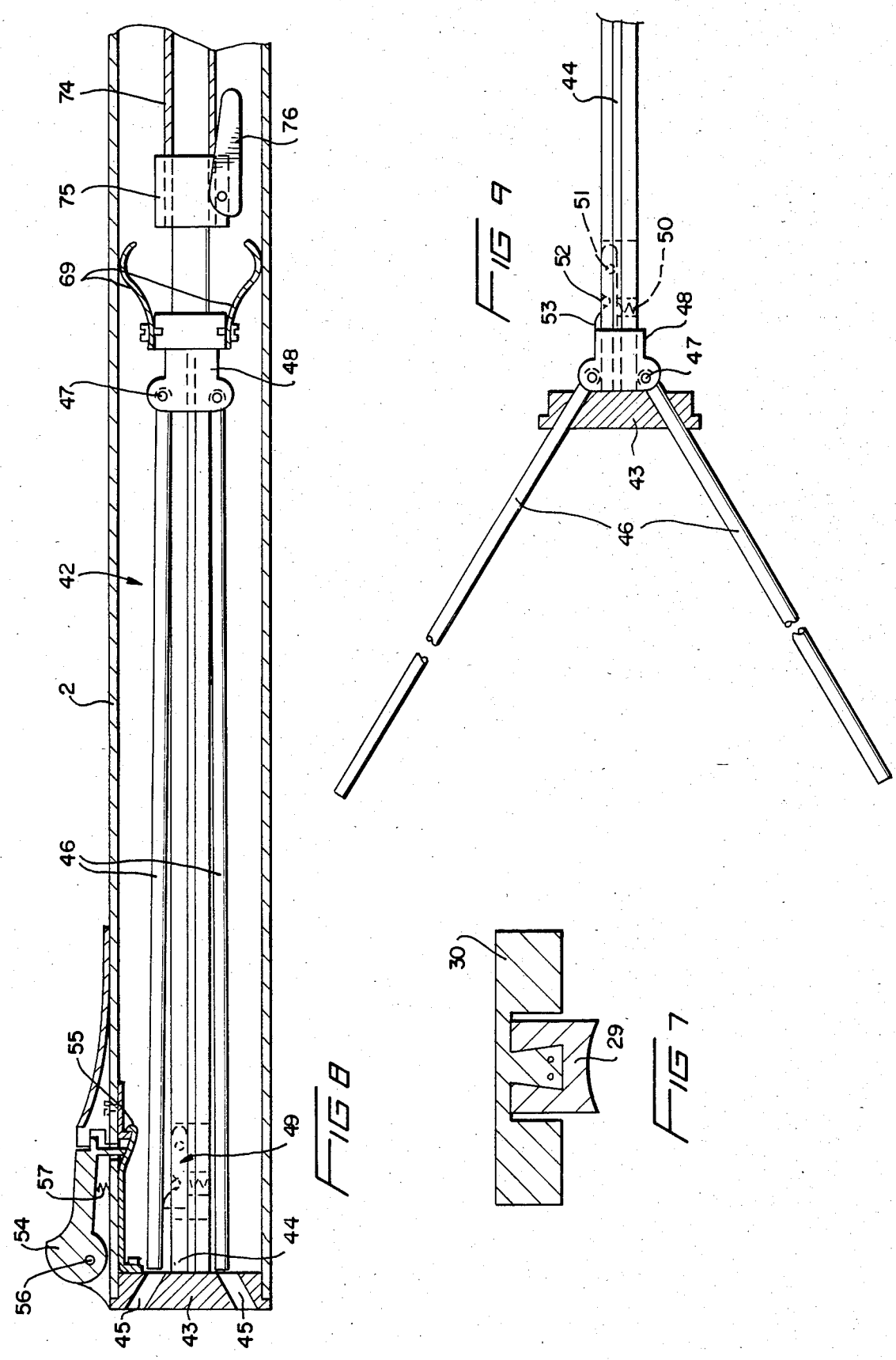

CAMERA GUN

BACKGROUND OF THE INVENTION

1. Field of the Invention

The invention relates to the activities of photography and hunting and, in particular, a device which lets the two activities by combined in a most realistic way.

2. Description of the Prior Art

It has been known to mount a camera on top of a gun stock for stabilization purposes. However, very little development has been made in the area of designing a simulated firearm with features that are realistic to actual firearms but which can be used instead for purposes of photography. It is well known that sportsmen take great pride in their firearms. Therefore, the novel construction of a firearm features to aid in the hobby of photography without changing the cosmetic appearance of a simulated firearm which supports a camera is highly desirable to a sportsman.

SUMMARY OF THE INVENTION

This invention improves on the prior art devices by providing for clever and inventive adaptations to features of a firearm which allows those features to be used in the art of photography.

The inventive device has been purposely designed to look and handle like a high quality firearm and therefore imparts the same aesthetic appeal and pride of ownership that a finely crafted firearm would instill. The design of this simulated firearm is more than cosmetic. It provides a superior method of holding and focusing a camera with a high degree of stability while allowing the camera to be easily transported to and from the field where it can be used to photograph wildlife and scenery.

Even though it has been known to mount cameras on rifle stocks, the inventive device provides greater stability in supporting a camera partially due to the fact that the rifle has a barrel which puts weight in the forehand while allowing the stock to be braced by the shoulder and face in a three point support system. When used in a sitting position, this arrangement gives even more stability. Without the weight of the barrel in the forehand, the leverage of the stocks fore end does not yield its maximum advantage; therefore, the camera's stock without a barrel does not produce results which are markedly better than that achieved by simply holding a camera in one's hand.

In addition to adding to the realistic cosmetic appeal described above, the addition of a barrel to a rifle stock allows the same balance and handling characteristics as an actual firearm. The barrel is also used to house a tripod or a bipod so that such support system can be out of the way when the device is being transported, but easily secured to the simulated firearm for additional support when the device is being deployed. The barrel further provides a location as far forward as desired where a tripod mount can be attached; it has been found that placing a tripod too close to the shooter reduces support and therefore a barrel allows for considerable flexibility as to the location of this attachment. .

Another unique feature of the inventive device is the design of a film dispenser incorporated into the simulated firearm as a mechanism which on the exterior appears to be similar to the bolt action of a firearm which is used to dispense ammunition. The film can be fed up from a magazine or forward from a rear portion of the barrel. This magazine area, if not used as a film dispenser, can be utilized as a small tool compartment for a lens cleaner, brushes, a small screw driver and other accessories used in the hobby of photography.

The inventive device includes a fast focus mechanism in which a slide can be manipulated longitudinally in order to focus the camera lens through the use of a connecting arrangement. This can be done quite easily with the hand used to support the front end of the rifle stock while still supporting the rifle stock. Therefore, the operation of focusing does not require moving the support hand from the stock and allows the photographer to follow the subject to be photographed unhampered by a separate maneuver of releasing the forward portion of the stock and maneuvering the lens in a disruptive operation. The slide focus is designed to be accommodated by a raised quarter rib, which is a device utilized on high-powered rifles. The function of the rifle quarter rib is to support the rear sight of a firearm. These ribs are present on the most expensive rifles and are recognized by firearm connoisseur's as a deluxe appointment. Therefore, the inventive device captures the aesthetic appeal of the quarter rib while incorporating it to perform the focusing function.

BRIEF DESCRIPTION OF THE DRAWING

FIG. 1 is a side elevation view in partial cross-section of the film storage mechanism;

FIG. 2 is a top view in partial cross-section of the film storage mechanism;

FIG. 3 shows an end view of the film carrier in the lower housing;

FIG. 4 is a side elevation view in partial cross-section of the fast focus mechanism;

FIG. 5 is a side elevation view of a second embodiment of the fast focus mechanism;

FIG. 6 is a side elevation view of a third embodiment of the fast focus mechanism;

FIG. 7 is an end view in cross-section of the slide and quarter rib portion of the fast focus mechanism;

FIG. 8 is a side elevation view in partial cross-section of the support stand housed in the gun barrel;

FIG. 9 is a side elevation view in partial cross-section of the support stand in an extended position;

DESCRIPTION OF THE PREFERRED EMBODIMENT

Figure 10:
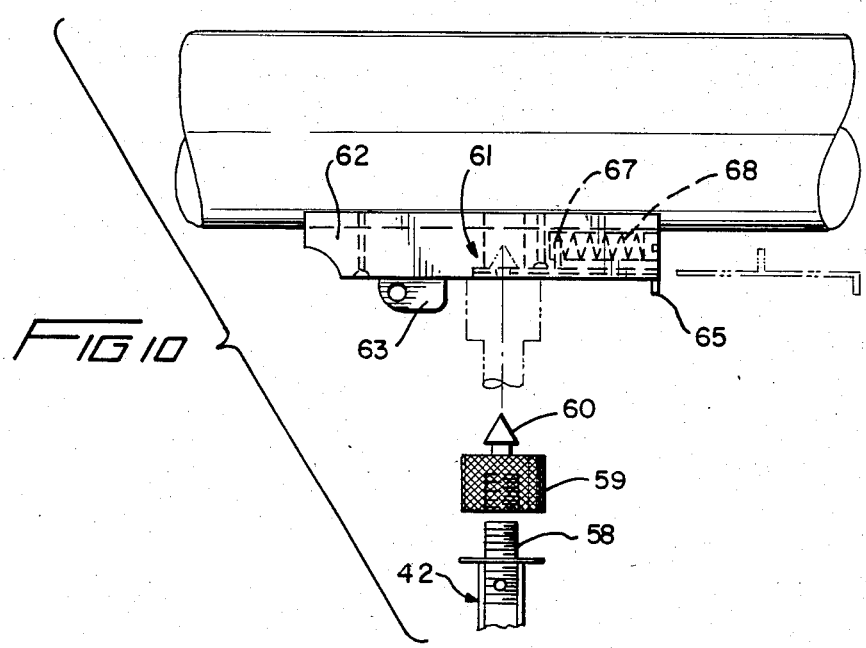
FIG. 10 is a side elevation view in partial cross-section of the connecting means for mounting the support stand on the simulated firearm.
Figure 11:
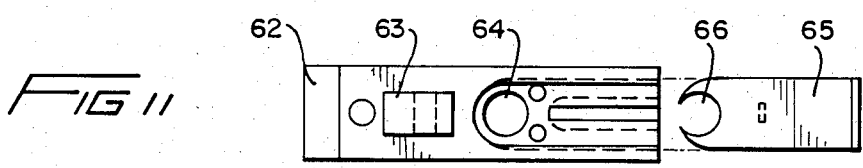
FIG. 11 is a bottom view of the connecting means shown in FIG. 10.

FIGS. 1 and 2 show an arrangement in a camera gun which allows for the storage and ready access of film cartridges. It includes a gun stock 1 with a barrel 2 mounted on top of stock 1. Barrel 2 includes a chamber portion 3 which is similar to the chamber of a conventional firearm. A bolt 4 is mounted in barrel 2 for movement through chamber portion 3 in a slidable fashion.

A lower housing 5 is located in a portion of stock 1 beneath the chamber 3. Lower housing 5 is of sufficient size to accommodate a film cartridge 6 which rests on a film carrier 7 which is biased toward the chamber by lower spring means 8 which fits in lower spring means channel 9. This arrangement can be also seen in FIG. 3.

A film carrier guide 10 is used to keep film cartridge 6 properly oriented in its stored position.

A second film cartridge 11 is stored in an upper housing 12 which is located in a portion of barrel 2 adjacent to chamber 3. Upper spring means 13 is used to bias film cartridge 11 toward chamber 3. Film cartridge 11 is retained in the stored position by detent means including film release stop 14 which is connected to a rocker actuator portion 15 that is pivotally mounted on pin 16 and biased by spring 17. Bolt 4 is biased by a spring 18 toward a closed position in which it occupies chamber 3. A bolt detent 19 is mounted so as to pass through an aperture 20 in bolt 4 when bolt 4 is in an open position such that it is not occupying chamber 3. Detent 19 is biased in an upward position by spring 21 which allows detent 19 to be depressed below the surface of bolt 4 in which aperture 20 is located.

Bolt 4 contains a longitudinally running groove 77 and barrel 2 contains a first guide rod 78 which mates with groove 77 to allow aperture 20 in bolt 4 to be oriented with bolt detent 19 each time the bolt is pushed forward. Barrel 2 also contains a second guide rod 79 which is accommodated by a bore 80 in bolt 4.

If lower housing 5 is not being used to store film cartridges, it may be used to store photographic accessories and can be accessed through a hinged floor plate 22.

The operation of the film storage means is as follows. Bolt 4 is placed in an open position. Film cartridge 11 is either inserted into upper housing 12 manually or by the following procedure. Film cartridge 11 is placed on film carrier 7 which has its upper surface approximately at the level of the lower portion of the barrel. Bolt 4 is then closed by depressing detent 19 and sliding bolt 4 rearward to load film cartridge 11 into upper housing 12. The front end of film cartridge 11 snaps in behind film release stop 14 thereby compressing upper spring means 13.

A second film cartridge 6 is loaded into the assembly by sliding bolt 4 into an open position for a second time, placing film cartridge 6 in chamber 3, manually depressing film cartridge 6 into lower housing 5 thereby depressing lower spring means 8, and closing bolt 4 after depressing detent 19.

The film cartridges are removed from the assembly in the following manner. Bolt 4 is slid forward into an open position, thereby releasing film cartridge 6 which pops out of chamber 3 due to the action of lower spring means 8. Film cartridge 11 can be removed by depressing rocker actuating portion 15 of the detent means which moves film release stop 14 out of the way of film cartridge 11 so that upper spring means 13 ejects film cartridge 11 from upper housing 12 into chamber 3 where it can be easily removed from the assembly.

FIG. 1 also shows the use of conventional double set-triggers 23 which are used to actuate the shutter of a camera which is attached to the firearm portion of the assembly. As is conventional in the use of double set-triggers in firearms, rear trigger 24 is pulled to set a hair spring which is then released by forward trigger 25 thereby actuating the shutter. The mechanical action of the triggers 23 is transmitted through an actuating means 26 which can be connected to the camera shutter either electrically or mechanically through line 27 which passes through an aperture 28 in the firearm portion of the assembly.

FIGS. 4-7 diagram the fast focus portion of the assembly. Base means for the fast focus arrangement includes a quarter rib 29 mounted on barrel 2. Slide means 30 is slidably mounted on quarter rib 29 through the use of a dovetail type arrangement as shown in FIG. 7. A camera 31 is mounted on the firearm portion of the assembly through the use of a conventional style mount 32.

As shown in the embodiment of FIG. 4, camera 31 has a focusing ring 33 which allows the camera to be focused through rotation of that ring. Focusing ring 33 is attached to slide means 30 through the use of a connecting means such as cable 34. Focusing ring 33 includes an attachment means 35 such as a screw and cover plate which is used to attach cable 34 to focusing ring 33. A pulley 36 is mounted in quarter rib 29 and helps define the path of cable 34. Pulley 36 is mountable upon pin 37. Cable guide rib means 38 extend from attachment means 35 in diverging helical paths in order to more affectively allow cables 34 to rotate the focusing ring 33. One segment of cables 34 is attached to slide means 30 through the use of a screw 39 or a similar clamping device.

The embodiments shown in FIGS. 5 and 6 use a fast focus mechanism similar to that shown in FIG. 4 except that they are applicable to a camera having a push-pull focusing mechanism as opposed to a rotatable focusing ring.

In FIG. 5 slide means 30 is slidably mounted on quarter rib 29. Cables 34 pass around a front pulley 36. One end of cable 34 is attached to a finger 40 of the camera's push-pull focus mechansim. The other end of cable 34 passes around a rear pulley 41 and is attached to finger 40 of the camera's focusing system.

In FIG. 6 slide means 30 is connected to rod 70 by a screw connection at the forward end 71 of rod 70. The rear end of rod 70 is adjustably attached to finger 40 of the camera's push-pull focus mechanism by a screw portion at the rear end 72 of rod 70 and two nuts 73.

The operation of the fast focus mechanism is as follows. In the embodiment shown in FIG. 4, sliding movement of slide means 30 causes focusing ring 33 to rotate and focus the camera. In the embodiments shown in FIGS. 5 and 6, sliding movement of slide means 30 causes the focusing finger 40 of the push-pull focusing mechanism to move in or out and thereby focus the camera.

FIGS. 8-12 show a support stand in combination with a camera gun including structure for its storage and deployment.

FIG. 8 shows the muzzle end of barrel 2 with a support stand 42 in storage position. The support stand includes a fore end cap 43 which fits over the muzzle of barrel 2. Fore end cap 43 is attached to an elongated center rod means 44 and is provided with apertures 45 to accommodate legs 46 of support stand 42. Legs 46 pivot about pins 47 located on a collar 48 which is slidable along center rod means 44. FIG. 8 shows the support stand in its stored collapsed position and FIG. 9 shows the support stand in its fully extended position. A pivoting spring biased detent 49 is used to hold collar 48 in its extended position as shown in FIG. 8. Collar 48 slides down rod 44 and over detent 49 to lock into position between fore end cap 43 and detent 49. Detent 49 is spring biased by spring 50, pivots around pin 51 and is prevented from excessive outward movement by pin 52. Detent 59 may be released by manually depressing portion 53 and sliding collar 48 over detent 49 to allow the legs to be placed in a collapsed position.

As shown in FIG. 8, the support stand may be provided with a telescoping upper portion 74 which can be locked in place by a conventional clamp 75 and lever means 76.

FIG. 8 shows a detent arrangement used to retain support stand 42 inside barrel 2 for storage purposes. A detent mechanism located at the muzzle of barrel 2 includes a spring biased pivotable front sight 54 which can be manually depressed to release a catch 55 which is attached to fore end cap 43. Since fore end cap 43 is a part of the support stand assembly, its retention or release effects the retention or release of support stand 42 stored in barrel 2. Front sight 54 can be seen to pivot about pin 56 and be biased by spring 57.

FIG. 10 shows the top portion of support stand 42 which includes a connection means 58 such as a male threaded rod portion. A knurled adaptor 59 contains a male part 60 which is accommodatable by a female part 61 on the underside of barrel 2. Adaptor 59 can be connected to connection means 58 and inserted into female part 61 to support the camera gun assembly. It is noted that support stand 42 is adapted to be used directly with a camera without attachment to the firearm portion of the assembly through the use of connection means 58 which is dimensioned to accommodate the screw mounting portion of a conventional camera. Therefore, support stand 42 can be used to support either a camera gun arrangement or the camera in a state in which it is not assembled to the firearm portion of the device. Female part 61 comprises a base portion 62 which is attached to barrel 2 and which can contain a sling swivel 63 for ease in carrying the assembly. Base plate 62 contains an aperture 64 which can accommodate the male part 60 of adaptor 59.

A spring biased catch plate 65 fits in a slot 66 in base 62. Plate 65 includes a curved aperture portion 66 which, in combination with aperture 64, locks snugly around male part 60 of adaptor 59. A lug 67 on plate 65 is attached to spring 68 in order to bias plate 65 in a locking position about male part 60.

As shown in FIG. 8, the portion of support stand 42, such as collar 48 may be provided with spring tension clips 69 to retain support stand 42 in place and prevent it from rattling.

Figure 12:
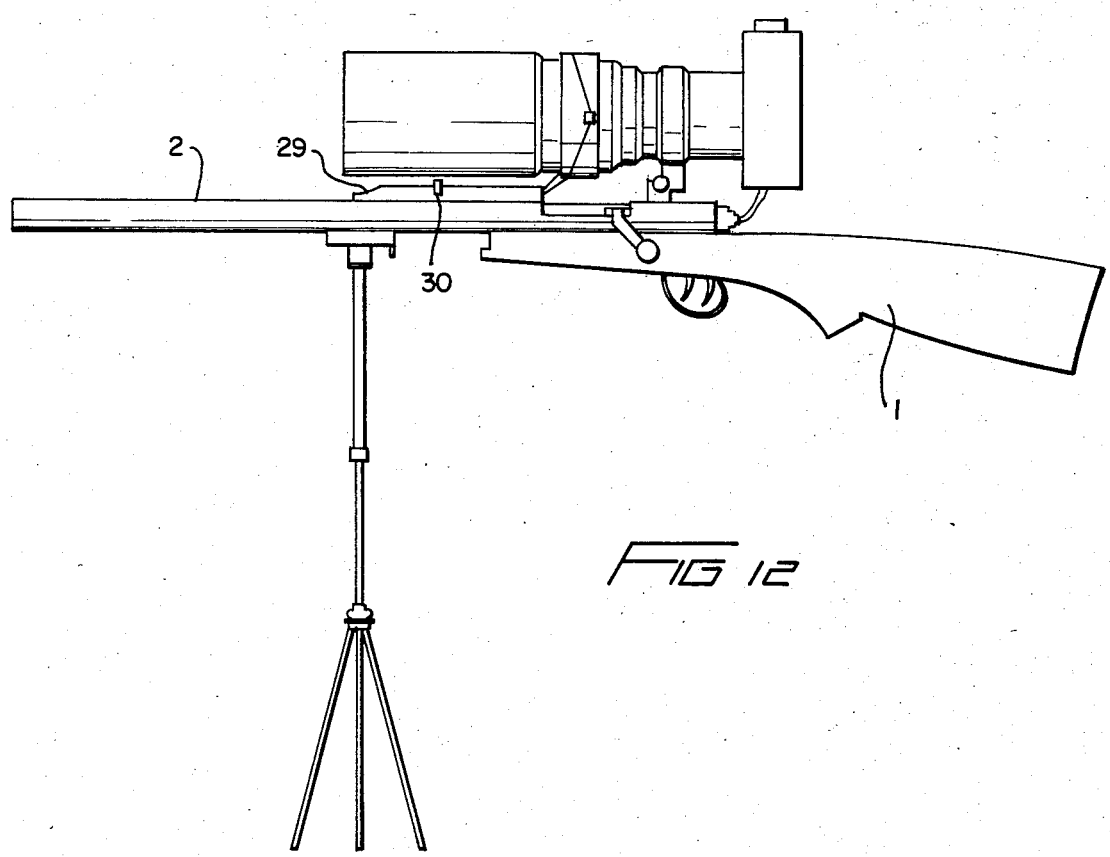
FIG. 12 is a side elevation view of the camera gun assembly mounted on the support stand.

FIG. 12 shows a full view of the camera gun assembly mounted on the support stand.

It is understood that the invention is not limited to the specific embodiment shown in the drawing and described in the specification, but is defined and limited only by the claims that follow.

What is claimed is:

1. An assembly for mounting a camera and having the appearance of a firearm comprising: means for supporting a camera including a stock and a barrel mounted on the stock; a chamber portion in the barrel; a bolt which is slidably mounted within the chamber; and film storage means communicating with the chamber so that a film cartridge can be stored in the film storage means and removed from the chamber when the bolt is open.

2. An assembly as claimed in claim 1 wherein the film storage means includes a lower housing located in a portion of the stock beneath the chamber.

3. An assembly as claimed in claim 2 wherein the film storage means includes lower spring means to cause a film cartridge stored in the lower housing to be biased toward the chamber portion to facilitate removal of the film cartridge.

4. An assembly as claimed in claim 3 wherein the lower spring means serves to eject a film cartridge from the lower housing through the chamber when the bolt is opened.

5. An assembly as claimed in claim 1 wherein the film storage means includes an upper housing located in a portion of the barrel adjacent to the chamber.

6. An assembly as claimed in claim 5 wherein the upper housing includes upper spring means to cause a film cartridge to be biased toward the chamber portion.

7. An assembly as claimed in claim 6 wherein the upper housing contains film detent means to retain a film cartridge in the upper housing when the bolt is open until the film detent means is released, whereupon a film cartridge in the upper housing is ejected into the chamber.

8. An assembly as claimed in claim 6 wherein the film detent means includes a rocker actuating portion.

9. An assembly as claimed in claim 3 wherein the lower spring means includes a film carrier on which to rest a film cartridge to be stored in the lower housing and wherein the film storage means includes an upper housing located in a portion of the barrel adjacent to the chamber and wherein the film carrier is approximately at the level of the bottom of the upper housing when there is no film cartridge in the lower housing.

10. An assembly as claimed in claim 1 wherein the bolt is biased toward a closed position.

11. An assembly as claimed in claim 10 further comprising bolt detent means to detain the bolt in an open position.

12. An assembly as claimed in claim 11 further comprising an aperture in the bolt and wherein the bolt detent means comprises a spring mounted bolt detent engageable with the aperture in the bolt so that the bolt detent is released by manually pressing the bolt detent through the aperture.

13. An assembly as claimed in claim 1 further comprising a floor plate in the underside of the assembly to provide access to the lower housing.

14. An assembly as claimed in claim 1 wherein the assembly has a rearward end which is positioned toward the operator during use and a forward end which is positioned away from the operator during use, and wherein the bolt is positioned forward of the chamber when the bolt is open.

15. As assembly as claimed in claim 1 wherein the bolt further comprises a longitudinally running groove means and the barrel contains a first guide rod means which mates with the groove means so that the bolt will be in a predetermined angular orientation when it is open.

16. An assembly as claimed in claim 15 wherein the barrel further comprises a second guide rod means and the bolt further comprises a bore which mates with the second guide rod means.

17. An assembly for mounting a camera with focusing means, the assembly having the appearance of a firearm comprising: means for supporting a camera with focusing means, the supporting means including a stock and a barrel mounted on the stock having the appearance of a firearm barrel mounted on a firearm stock; fast focus means mounted on the barrel; said fast focus means including base means extending longitudinally along the barrel, slide means engageable with the base means so that the slide means is slidable on the base means longitudinally along the barrel, and connecting means for connecting the slide means to the focusing means of the camera when mounted on the assembly so that sliding movement of the slide means longitudinally along the barrel causes the focusing means to move for focusing of the camera.

18. An assembly as claimed in claim 17 wherein the base means has the shape of a quarter rib.

19. An assembly as claimed in claim 17 wherein the connecting means includes a cable which is attachable to the focusing means of the camera so that it causes the focusing means to move as the slide means is slid longitudinally along the barrel.

20. An assembly as claimed in claim 19 wherein the base means has a traveler system which includes a pulley around which the cable passes.

21. An assembly as claimed in claim 17 wherein the base means comprises a plurality of segments which are arranged longitudinally along the barrel.

22. An assembly as claimed in claim 19 wherein the focusing means of the camera is a focusing ring that rotates as the slide means is slid longitudinally along the barrel.

23. An assembly as claimed in claim 19 further comprising cable guide rib means mounted on the focusing ring of the camera to accommodate and guide the cable.

24. An assembly as claimed in claim 23 further including attachment means for securing the cable to the focusing ring and wherein the cable guide rib means longitudinally extend in two approximately helical paths which diverge from the attachment means.

25. An assembly as claimed in claim 20 further comprising a second pulley around which the cable passes.

26. An assembly as claimed in claim 17 wherein the connecting means is a rod capable of transmitting both tensile and compressive loads.

27. An assembly as claimed in claim 17 wherein the base means include a rib extending longitudinally along the top of at least part of the barrel.

28. An assembly as claimed in claim 17 wherein the base means extends along the top of the barrel.

29. An assembly as claimed in claim 28 wherein the rib comprises a plurality of segments which are arranged longitudinally along the barrel.

30. An assembly for mounting a camera and having the appearance of a firearm comprising: means for supporting a camera including a stock and a barrel having a bore and a muzzle end; the barrel mounted on the stock and having the appearance of a firearm barrel mounted on a firearm stock; and support stand securing means on the barrel for releasably securing a support stand in the bore of the barrel so that a support stand can be stored in and removed from the bore of the barrel.

31. An assembly as claimed in claim 30 wherein the underside of the assembly has a connecting means for attachment to a support stand.

32. An assembly as claimed in claim 31 wherein the connecting means includes an adjustably sized female part engageable with a male part of the support stand.

33. An assembly as claimed in claim 31 wherein the connecting means is integral with a sling swivel.

34. An assembly as claimed in claim 30 wherein the support stand securing means includes a support stand detent in the barrel.

35. An assembly as claimed in claim 34 further comprising a front sight portion mounted on and moveable with respect to the barrel to actuate the support stand detent.

36. An assembly as claimed in claim 34 further comprising a fore end cap which fits the muzzle of the barrel.

37. An assembly as claimed in claim 36 further comprising a support stand which can be stored in the barrel of the assembly comprising an elongated center rod means, having two ends, one end of which is attached to the fore end cap; a plurality of elongated legs slidably connected to the center rod means; said fore end cap having apertures to accommodate said plurality of legs to that said legs can be extended through said apertures when said legs are slid along said center rod means to an extended position.

38. An assembly as claimed in claim 37 further comprising a leg detent to lock the legs in an extended position.

39. An assembly as claimed in claim 37 wherein said support stand includes spacer means which secure said stand in place while being stored in the barrel by spacing the stand from the barrel.

40. An assembly as claimed in claim 38 further comprising a collar which is attached to the legs and which is securable between the leg detent and the fore end cap.

41. An assembly as claimed in claim 37 wherein the other end of the center rod means includes an adapter connection means; an adapter with a male part, said adapter being connectable with the adapter connection means; so that the male part is connectable with a female part on the underside of the barrel and stock portion of the assembly so that the barrel and stock portion of the assembly is supportable on the support stand when the adapter is in place on the support stand, and so that a camera is connectable with the connection means when the adapter is not in place on the support stand, whereby the camera is directly supportable on the support stand without any intervening structure.

42. An assembly as claimed in claim 17 wherein the floor plate is hinged.

43. An assembly for mounting a camera and having the appearance of a firearm comprising: means for supporting a camera including a stock and a barrel having a bore and a muzzle end, the barrel mounted on the stock and having the appearance of a firearm barrel mounted on a firearm stock; a support stand which can be stored in the barrel; and means for releasably securing the support stand in the bore of the barrel so that the support stand can be stored in and removed from the bore of the barrel.

44. An assembly as claimed in claim 43 wherein said support stand is removeable from the muzzle end of the barrel.

45. An assembly for mounting a camera and having the appearance of a firearm comprising: means for supporting a camera including a stock and a barrel having a bore and a muzzle end, the barrel mounted on the stock and having the appearance of a firearm barrel mounted on a firearm stock; a connecting means including spring biassed detent means on the underside of the assembly for attachment of the assembly to a support stand.

46. An assembly as claimed in claim 45 including a sling swivel on the underside of the assembly integral with the connecting means.

* * * * *